United States Patent
Hafermalz et al.

(10) Patent No.: US 8,087,830 B2
(45) Date of Patent: Jan. 3, 2012

(54) RADIALLY MOBILE FLOATING BEARING

(75) Inventors: Jens-Uwe Hafermalz, Waeschenbeuren (DE); Dennis Fuechsel, Schwaebisch Gmuend (DE)

(73) Assignee: ZF Lenksysteme GmbH, Schwaebisch Gmuend (DE)

( * ) Notice: Subject to any disclaimer, the term of this patent is extended or adjusted under 35 U.S.C. 154(b) by 0 days.

(21) Appl. No.: 12/799,470

(22) Filed: Apr. 26, 2010

(65) Prior Publication Data

US 2010/0260448 A1 Oct. 14, 2010

Related U.S. Application Data

(63) Continuation of application No. PCT/EP2008/067106, filed on Dec. 9, 2008.

(30) Foreign Application Priority Data

Dec. 14, 2007 (DE) .................. 10 2007 055 814

(51) Int. Cl.
*F16C 43/00* (2006.01)
*F16C 27/00* (2006.01)

(52) U.S. Cl. ......... 384/537; 384/215; 384/295; 384/535

(58) Field of Classification Search ........... 384/215.295, 384/535–537, 581, 582, 584
See application file for complete search history.

(56) References Cited

U.S. PATENT DOCUMENTS

| 3,071,419 A * | 1/1963 | Lower et al. ................. 384/295 |
| 3,554,619 A * | 1/1971 | Irwin ........................... 384/536 |
| 7,686,515 B2 * | 3/2010 | Schust .......................... 384/220 |
| 2003/0127277 A1 | 7/2003 | Murakami et al. |
| 2004/0084865 A1 | 5/2004 | Kitami et al. |
| 2008/0199114 A1 | 8/2008 | Schust |

FOREIGN PATENT DOCUMENTS

| DE | 10 2005 035 020 | 2/2007 |
| EP | 1 679 447 | 7/2006 |

* cited by examiner

*Primary Examiner* — James Pilkington
(74) *Attorney, Agent, or Firm* — Jordan and Hamburg LLP

(57) ABSTRACT

Disclosed is a radially movable floating bearing for a shaft of a gear of a steering system, comprising a bushing or an inner ring or a rolling bearing, which is supported in a seat of a frame or housing of the gear. The inner ring or the bushing or the rolling bearing is held by at least one support element made of material having elastomeric properties which is inserted into a gap between the seat and the inner ring, the support element being designed as a pivot bearing. In order to provide a radially movable floating bearing for a steering system gear shaft, which is low-noise, easy to pivot and highly resilient, the pivot bearing cooperates with a damping stop disposed tangentially at a distance thereto, the stop being disposed at a radial distance from the inner ring or the seat.

20 Claims, 3 Drawing Sheets

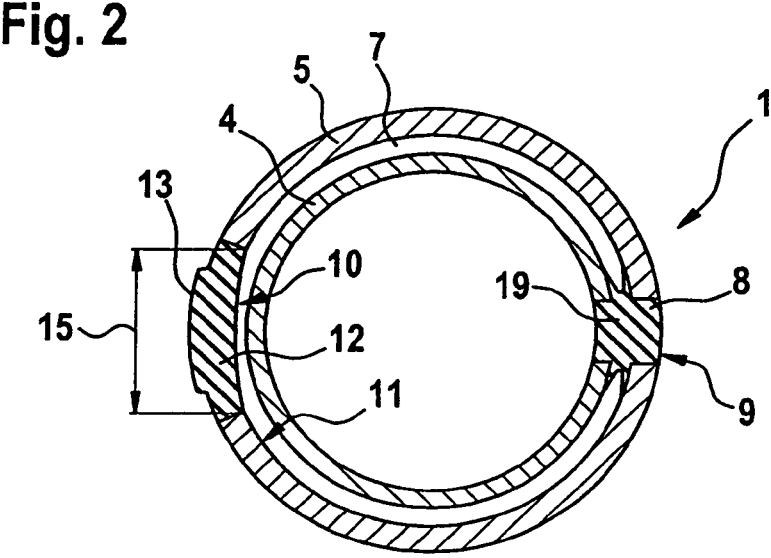
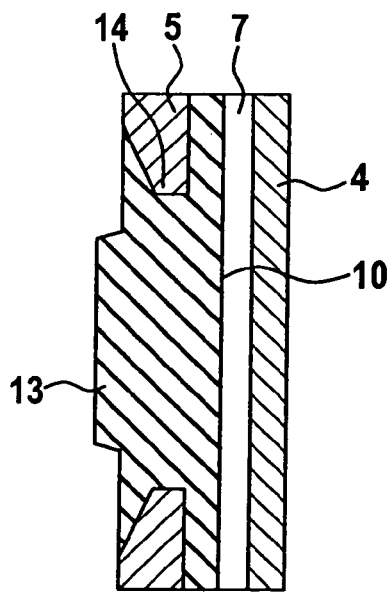
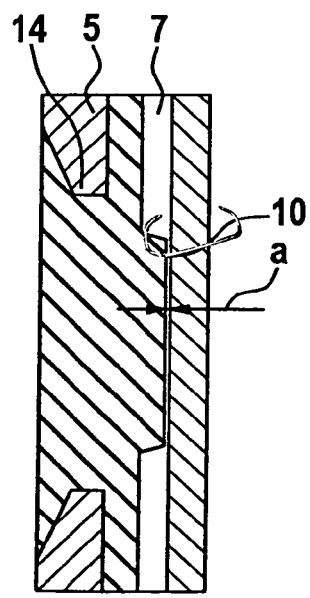

RADIALLY MOBILE FLOATING BEARING

The invention relates to a radially mobile floating bearing for a steering system gear shaft.

BACKGROUND OF THE INVENTION

In steering system transmissions, and particularly with rack-and-pinion steering gears or helical gears or worm gears, shafts are supported by way of driving wheels, such as pinions or worms, in a fixed bearing and a radially movable floating bearing. For this purpose, the floating bearing has a degree of freedom which allows the driving wheel to rotate and roll play-free on the driven wheel or a toothed rack using a pressing device. The pressing device is further used to compensate for wear between the driving and driven wheels, or the corresponding denticulation between the wheels. This leads to the production of noise, particularly when changing the direction of rotation of the shaft, such as when reversing the direction of travel with steering gears.

US 2004/0084865 A1 describes an electric steering system, the actuator of which constitutes an electric motor with a flange-connected worm gear. A shaft, which is arranged rotation-fast with a cylindrical worm in a gear housing, is supported by way of two rolling bearings as fixed bearings. In order to prevent noise from the denticulation between the cylindrical worm and the worm wheel, the publication suggests arranging an elastic coupling layer between the shaft and the cylindrical worm. This design measure is complex from a manufacturing perspective, and it does not allow for compensation for the wear in the denticulation.

DE 10 2005 035 020 A1 shows and describes a radially movable floating bearing for a steering system gear shaft, comprising a bushing or inner ring which is supported in a seat of a steering gear housing, wherein the inner ring is held by at least one support element made of an elastomeric material that is inserted in a gap between the seat and the inner ring, the support element forming a pivot bearing.

When operating such a radially movable floating bearing, contact of the inner ring with the seat and the production of noise are not reliably prevented.

SUMMARY OF THE INVENTION

It is the object of the invention to create a radially movable floating bearing for a steering system gear shaft, which has low-noise, is easy to pivot, and is highly resilient.

Because the pivot bearing cooperates with a damping stop disposed tangentially at a distance thereto or opposite thereof, the damping stop being disposed at a radial distance from the inner ring or the seat, production of noise by the radially movable floating bearing is reliably prevented.

Preferred embodiments will be apparent from the dependent claims.

The damping stop is preferably designed as a flat structure having a circular segment longitudinal section, and is disposed on the inner circumferential surface of the seat or the frame. The damping stop can also be disposed on an outer circumferential surface of the inner ring, or of the bushing, or of the rolling bearing. It is preferably a molded body, which is produced by an elastomeric material injected into one or more openings in the seat, and/or in the frame, and/or in the inner ring, the elastomeric material meshing with the openings and being held by undercuts.

The radial distance of the damping stop from the inner ring or the seat of the radially movable floating bearing is preferably no more than 0.1 mm during the operation of the radially movable floating bearing, but may also be higher for operational reasons.

The distance can preferably be fixed only during and after the installation of the radially movable floating bearing in the seat or in the housing, or during or after the installation of the rolling bearing in the inner ring, and advantageously the damping stop can preferably be molded to or in the seat or the inner ring as an elastomer component, which initially extends radially away from the inner ring or the seat, and is pressed toward the inner ring by surfaces on the housing or the rolling bearing outer ring or the seat only after installation.

It may be advantageous to form the damping stop using an element that has elastomeric properties that is pressed radially toward the seat, after installing the rolling bearing.

It may also be advantageous to form the damping stop using a bead which, prior to installing the rolling bearing, protrudes away from the seat or protrudes from an inner surface of the inner ring, the bead protruding in the opposite direction of the seat after installing the rolling bearing.

The pivot bearing and/or the damping stop can be fixed by positive fitting and/or bonded to the inner ring, or the seat, or the frame, and it may be advantageous to provide a dovetail guide or a dovetail-like guide, which is formed around the circumference of the damping stop.

The damping stop extends tangentially along the interior of the seat, over a circumferential section of approximately ⅙ of the total circumference of the inner ring. The pivot bearing can also be produced from an elastomeric material injected into one or more openings in the seat, and/or in the frame, and/or in the inner ring. It may furthermore be advantageous to fix the pivot bearing, as with the damping stop, by positive fitting and/or bonding in the seat, and/or in the inner ring, and/or in the frame. The seat, and/or the inner ring, and/or the bushing can be produced from plastic or metal.

The pivot bearing and the damping stop are preferably produced from one and the same elastomeric material.

One embodiment is shown below with reference to the drawings.

BRIEF DESCRIPTION OF THE DRAWINGS

FIG. 2 is a further cross-section of a radially movable floating bearing;

FIG. 3 is a longitudinal section of a detail IV in FIG. 2, prior to installing the radially movable floating bearing;

FIG. 4 is a longitudinal section of the radially movable floating bearing after installation;

DESCRIPTION OF THE PREFERRED EMBODIMENTS

Figure 1:
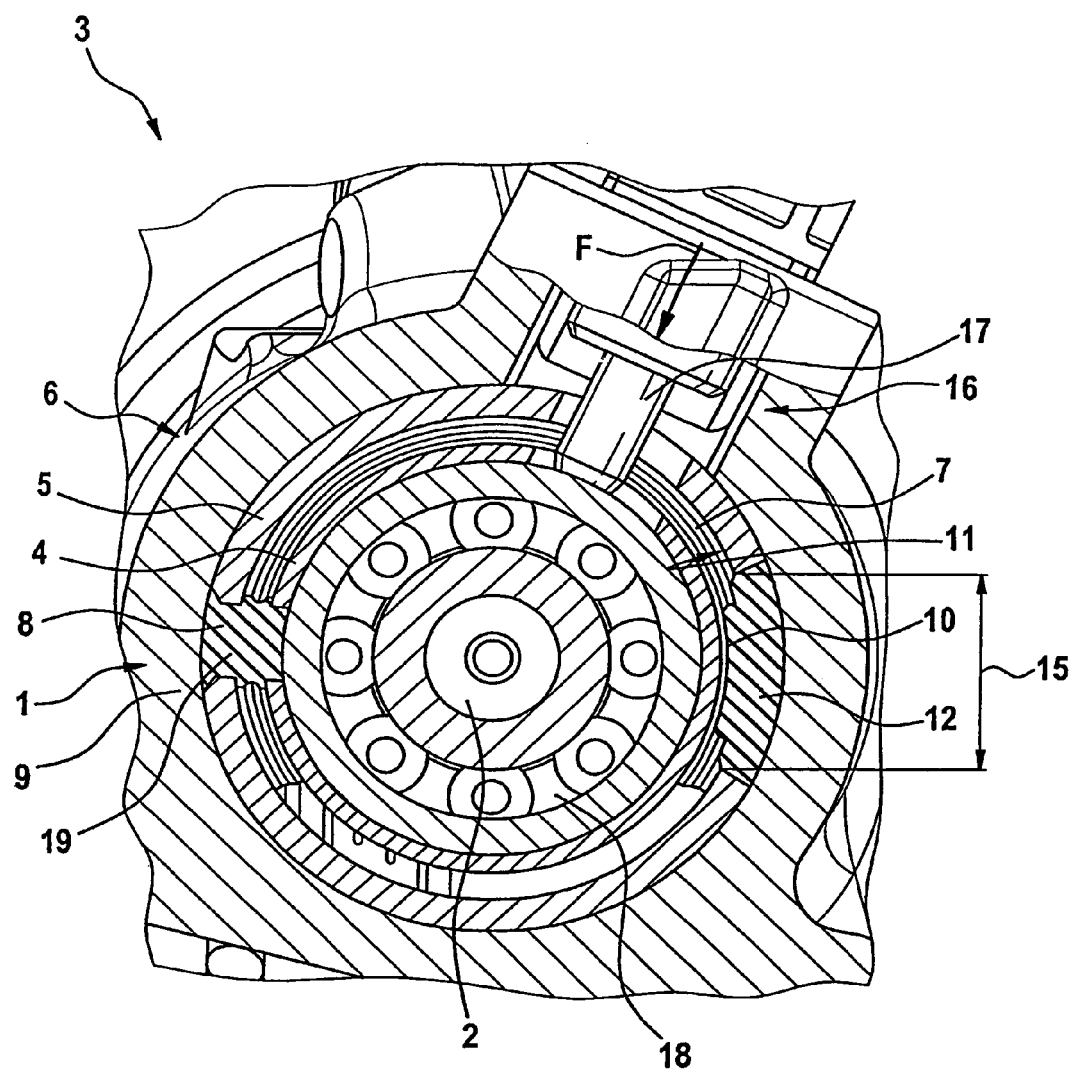
FIG. 1 is a schematic cross-section of a radially movable floating steering system gear bearing.

FIG. 1 shows a radially movable floating bearing 1 in a schematic cross-section of a frame 6, or housing, of a gear 3, the floating bearing being used to support a shaft 2, which bears a worm of the gear 3, which is not shown, which is designed as a worm gear, and is connected rotation-fast to the shaft 2. The radially movable floating bearing 1 is disposed in a seat 5 of the gear 3, and is subjected to a pressing force F in the radial direction x by a pressing device 16, which is partially shown, and more specifically by a pressure piece 17. As a result of the force F, the worm on the shaft 2 is pressed onto a gearing of a worm wheel, which is not shown.

The radially movable floating bearing 1 is designed as a rolling bearing 18, wherein an outer ring of the rolling bearing 18 is pivotably held in an inner ring 4 on a support element 8, which is made of elastomeric material, on the seat 5. The support element 8 forms a pivot bearing 9 with a pivot axis 19, which runs through the support element 8, the inner ring 4 being mobile in a gap 7, between the seat 5 and the inner ring 4. In this way, the support element 8 forms a pivot bearing 9 for the radially movable floating bearing 1.

The support element 8 is used to support lateral forces transverse to the degree of freedom of the radially movable floating bearing 1 shown by the arrow x, particularly during a change in the direction of rotation of the shaft 2 and the worm fixed thereon. The support element 8 transmits traction and pressure, and potential contact of the inner ring 4 with an inner circumferential surface 11 of the seat 5 is damped by a damping stop 10. The damping stop 10 is formed by an element 12 having elastomeric properties, which in the embodiment in FIGS. 1 to 4 held extending over a circumferential section 15 of approximately ⅙ of the total circumference of the seat 5.

As is shown in FIG. 3, the damping stop 10 is held positively in the annular seat 5 in the manner of a dovetail guide 14.

As shown by a comparison of FIGS. 2 and 3 with FIG. 4, in the uninstalled state, the damping stop 10 protrudes convexly outward from the seat 5 with a bead 13, and is pressed radially toward the inner ring 4 only after the seat 5 has been inserted into the frame 6 (see FIG. 4) with, for example, a radial distance of 0.1 mm remaining between the damping stop 10 and the inner ring 4.

Figure 5:
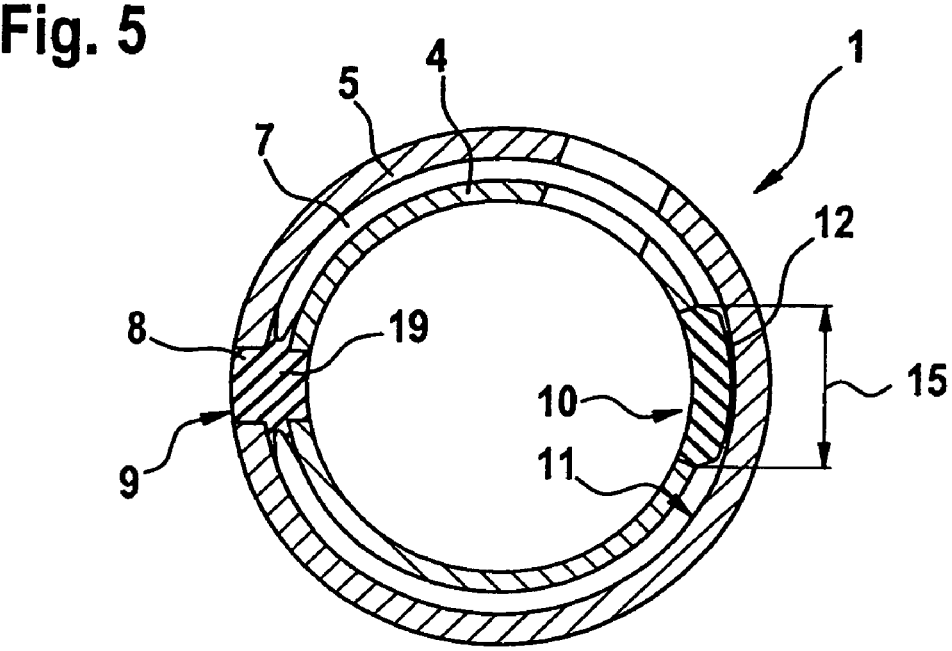
FIG. 5 is a further cross-section of a radially movable floating bearing, the damping stop of which is disposed on an inner ring, after installing the rolling bearing or the bushing.
Figure 6:
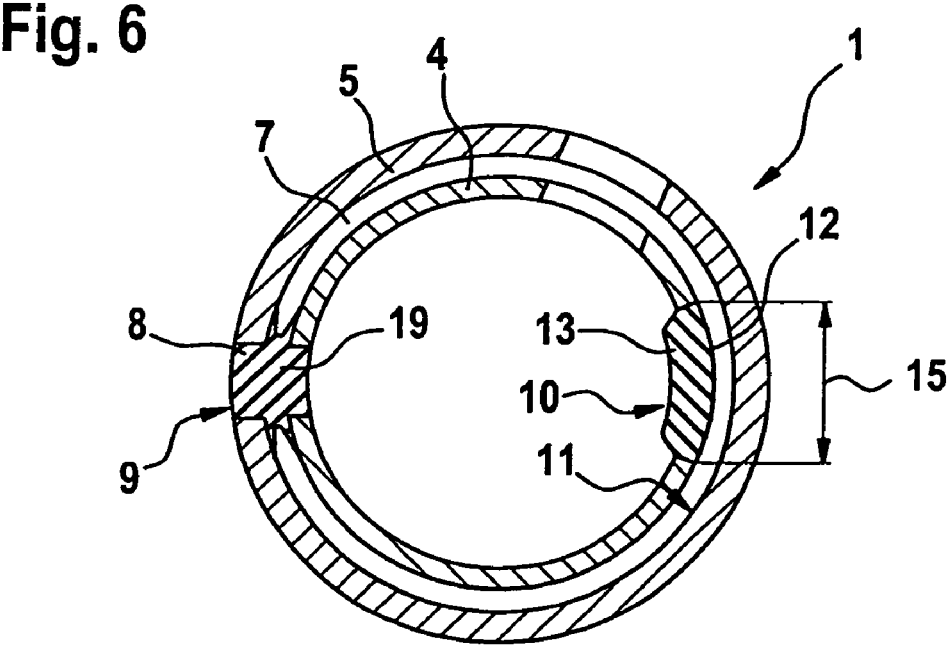
FIG. 6 shows a cross-section of the radially movable floating bearing from FIG. 5 before installation.

As is apparent from FIG. 6, in a further cross-section of a radially movable floating bearing, the damping stop 10 is disposed in the circumference of the inner ring 4 and initially protrudes radially inward towards the center of the radially movable floating bearing, and is pressed towards the seat 5 in the reverse radial direction, as soon as the radially movable floating bearing is installed (see FIG. 5).

The invention claimed is:

1. A radially movable floating bearing for a shaft of a gear of a steering system, comprising a rolling bearing in an inner ring, which is supported in a seat of a frame or housing of the gear, the inner ring being held by at least one support element made of a material having elastomeric properties that is inserted into a gap between the seat and the inner ring, the support element being designed so as to pivot with a pivot axis, the support element cooperating with a damping stop which is integrated on an opposing circumferential section of the seat, wherein prior to the installation of the radially movable floating bearing in the frame, the damping stop comprises a bead protruding radially away from the inner ring and protruding out of the circumferential section of the seat, the bead protruding in the opposite direction of the seat and being disposed at a radial distance from the inner ring after the radially movable floating bearing has been installed.

2. The radially movable floating bearing according to claim 1, wherein the damping stop is in the shape of a circular segment, and is disposed on an inner circumferential surface of the seat.

3. A radially movable floating bearing according to claim 1, wherein the damping stop is produced from an elastomeric material injected into at least one opening in the seat.

4. A radially movable floating bearing according to claim 1, wherein after the radially floating bearing has been installed the radial distance between the bead and the inner ring is no greater than approximately 0.1 mm.

5. The radially movable floating bearing according to claim 1, wherein the damping stop is held in the seat by way of a dovetail guide.

6. A radially movable floating bearing according to claim 1, wherein the damping stop extends tangentially over a circumferential section of no more than approximately ⅙ of the total circumference of the inner ring.

7. A radially movable floating bearing according to claim 1, wherein the support element is produced from an elastomeric material injected into at least one opening in the seat.

8. A radially movable floating bearing according to claim 1, wherein the support element is held by positive fitting in the seat.

9. A radially movable floating bearing according to claim 1, wherein the seat is made of plastic or metal.

10. A radially movable floating bearing according to claim 1, wherein the damping stop and the support element are made of the same elastomeric material.

11. The radially movable floating bearing according to claim 1, wherein the damping stop is held in the seat by a positive fit.

12. The radially movable floating bearing according to claim 1, wherein the damping stop is held in the seat by bonding.

13. The radially movable floating bearing according to claim 1, wherein the damping stop is held in the seat by a positive fit and bonding.

14. A radially movable floating bearing according to claim 1, wherein the support element is produced from an elastomeric material injected into at least one opening in the inner ring.

15. A radially movable floating bearing according to claim 1, wherein the support element is produced from an elastomeric material injected into at least one opening in the seat and the inner ring.

16. A radially movable floating bearing according to claim 1, wherein the support element is held by positive fitting in the inner ring.

17. A radially movable floating bearing according to claim 1, wherein the support element is held by bonding in the seat.

18. A radially movable floating bearing according to claim 1, wherein the support element is held by bonding in the inner ring.

19. A radially movable floating bearing according to claim 1, wherein the inner ring is made of plastic or metal.

20. A radially movable floating bearing according to claim 1, wherein the seat and the inner ring are made of plastic or metal.

* * * * *